US010113417B2

(12) United States Patent
Liu et al.

(10) Patent No.: US 10,113,417 B2
(45) Date of Patent: Oct. 30, 2018

(54) APPARATUSES AND METHODS FOR EVALUATING SYSTEMS USED IN ELECTROMAGNETIC TELEMETRY TRANSMISSIONS

(71) Applicant: EVOLUTION ENGINEERING INC., Calgary (CA)

(72) Inventors: Jili Liu, Calgary (CA); Ming Zhao, Calgary (CA)

(73) Assignee: Evolution Engineering Inc., Calgary (CA)

(*) Notice: Subject to any disclaimer, the term of this patent is extended or adjusted under 35 U.S.C. 154(b) by 26 days.

(21) Appl. No.: 15/306,065

(22) PCT Filed: May 14, 2015

(86) PCT No.: PCT/CA2015/050441
§ 371 (c)(1),
(2) Date: Oct. 21, 2016

(87) PCT Pub. No.: WO2015/172251
PCT Pub. Date: Nov. 19, 2015

(65) Prior Publication Data
US 2017/0044895 A1 Feb. 16, 2017

Related U.S. Application Data

(60) Provisional application No. 61/993,012, filed on May 14, 2014.

(51) Int. Cl.
G01V 3/00 (2006.01)
E21B 47/12 (2012.01)
H04Q 9/00 (2006.01)

(52) U.S. Cl.
CPC .......... *E21B 47/122* (2013.01); *E21B 47/121* (2013.01); *H04Q 9/00* (2013.01); *H04Q 2213/1316* (2013.01)

(58) Field of Classification Search
CPC ....... E21B 47/122; E21B 47/121; H04Q 9/00; H04Q 2213/1316
(Continued)

(56) References Cited

U.S. PATENT DOCUMENTS 4,160,970 A 7/1979 Nicolson
4,739,325 A * 4/1988 MacLeod .............. E21B 17/003
324/342

(Continued)

FOREIGN PATENT DOCUMENTS

EP 2743712 A1 * 6/2014 .......... G01R 31/026
WO 2012100217 A1 7/2012

*Primary Examiner* — Tanmay Shah
(74) *Attorney, Agent, or Firm* — Oyen Wiggs Green & Mutala LLP

(57) ABSTRACT

Methods and systems for testing connectivity in an EM telemetry system for transmission of a ground originating uplink EM telemetry signal. The methods and systems comprise a switch coupled to the link and configured to selectively connect the link to a test signal generator or a signal receiver, the test signal generator configured to generate a test signal and to supply it to a ground conductor, and the current within the link is measured to determine whether the link and ground conductor can properly transmit the ground originating uplink EM telemetry signal.

26 Claims, 8 Drawing Sheets

(58) Field of Classification Search
USPC .................................................. 340/853.2
See application file for complete search history.

(56) References Cited

U.S. PATENT DOCUMENTS

| | | |
|---|---|---|
| 5,959,548 A | 9/1999 | Smith |
| 6,781,520 B1 | 8/2004 | Smith et al. |
| 8,154,420 B2 | 4/2012 | Petrovic et al. |
| 2006/0145889 A1 | 7/2006 | Rawle et al. |

* cited by examiner

FIG. 5A

| CONDUCTOR 1 | 100Ω | GOOD |
| --- | --- | --- |
| CONDUCTOR 2 | 250Ω | FAIR |
| CONDUCTOR 3 | 270Ω | FAIR |
| CONDUCTOR 4 | 200Ω | FAIR |
| CONDUCTOR 5 | 205Ω | FAIR |
| CONDUCTOR 6 | 2000Ω | POOR |

FIG. 5B

| | GOOD | FAIR | POOR |
| --- | --- | --- | --- |
| CONDUCTOR 1 | ● | ○ | ○ |
| CONDUCTOR 2 | ○ | ● | ○ |
| CONDUCTOR 3 | ○ | ● | ○ |
| CONDUCTOR 4 | ○ | ● | ○ |
| CONDUCTOR 5 | ○ | ● | ○ |
| CONDUCTOR 6 | ○ | ○ | ● |

FIG. 5C

| CONDUCTOR 1 | 100Ω | ● |
| --- | --- | --- |
| CONDUCTOR 2 | 250Ω | ■ |
| CONDUCTOR 3 | 270Ω | ■ |
| CONDUCTOR 4 | 200Ω | ■ |
| CONDUCTOR 5 | 205Ω | ■ |
| CONDUCTOR 6 | 2000Ω | ✕ |

FIG. 5D

| CONDUCTOR 1 | 100Ω | ● |
| --- | --- | --- |
| CONDUCTOR 2 | 250Ω | ● |
| CONDUCTOR 3 | 270Ω | ● |
| CONDUCTOR 4 | 200Ω | ● |
| CONDUCTOR 5 | 205Ω | ● |
| CONDUCTOR 6 | 2000Ω | ○ |

APPARATUSES AND METHODS FOR EVALUATING SYSTEMS USED IN ELECTROMAGNETIC TELEMETRY TRANSMISSIONS

CROSS REFERENCE TO RELATED APPLICATIONS

This application claims priority from U.S. Application No. 61/993,012 filed 14 May 2014. For purposes of the United States, this application claims the benefit under 35 U.S.C. §119 of U.S. Application No. 61/993,012 filed 14 May 2014 and entitled APPARATUSES AND METHODS FOR EVALUATING SYSTEMS USED IN ELECTROMAGNETIC TELEMETRY TRANSMISSIONS which is hereby incorporated herein by reference for all purposes.

TECHNICAL FIELD

This application relates to subsurface drilling, specifically to apparatuses and methods used for testing, diagnosing, and managing systems used in communicating information to and from downhole equipment by electromagnetic telemetry. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole tool. A downhole tool may comprise any active mechanical, electronic, and/or electromechanical system that operates downhole. A downhole tool may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A downhole tool may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole tool may be incorporated into a drill string section or provided in a probe that is suspended in a bore of a drill string.

A downhole tool may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

Telemetry data may include data regarding a current orientation of a drill bit (sometimes called "tool face" data). Telemetry information may include data retrieved from sensors which monitor characteristics of the formations surrounding the well bore ("logging" data). Telemetry information may include information regarding the drilling itself (e.g. information regarding downhole vibration, characteristics of the wellbore being drilled, flow rate of drilling fluid, downhole pressure and the like).

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a BHA such that metallic drill pipe in the drill string above the BHA serves as one antenna element and metallic sections in the BHA serve as another antenna element. Electromagnetic telemetry signals can then be transmitted by applying electrical signals between the two antenna elements.

The EM telemetry signals typically comprise very low frequency AC signals applied in a manner that encodes information for transmission to the surface. Low frequencies are used because higher frequency signals are attenuated much more strongly than low frequency signals. The electromagnetic signals may be detected at the surface, for example by measuring electrical potential differences between the drill string or a metal casing that extends into the ground and one or more ground conductors.

Typically, a signal receiver is provided at or near the surface of the formation. The signal receiver is in turn connected by signal links to ground conductors placed in different areas around the formation and to a blowout preventer at the top of the drill string or metal casing. A plurality of ground conductors is typically used.

Through its electrical connections to ground conductors and the blowout preventer, the signal receiver may measure the variable potential differences resulting from the signals imposed between upper and lower parts by a signal generator coupled to the downhole tool. The signals imposed by the signal generator may have amplitudes of ones, tens or hundreds of volts, for example. The signals received at signal receiver are typically in the millivolt range or lower. Received signals may be discriminated from background electrical noise by taking account of the fact that the signals transmitted by signal generator have known frequency or frequencies. Therefore, information can be sent from a downhole location by way of a signal generator to the signal receiver.

The detection of EM telemetry signals through measurement of the difference in the electric potential between the drill rig and various surface grounding rods located in the formation surrounding the drill rig is described in U.S. Pat. No. 4,160,970.

There is a demand for reliable and effective telemetry. There is a particular need for improved testing, diagnosing, and managing connections between ground conductors and signal receivers in EM telemetry systems.

SUMMARY

This invention has a number of aspects. One aspect provides systems for testing connectivity in an EM telemetry system for transmission of a ground originating uplink EM telemetry signal. The system comprises one or more ground conductors in electrical contact with the ground and a signal receiver electrically connected to ground conductors through one or more links and configured to receive the uplink EM telemetry signal from the ground conductors. The system also comprises at least one switch coupled to the links and a test signal generator configured to generate an electrical test signal and to supply it to the ground conductors. The system further comprises a controller connected to the switch and configured to control the switch to selectively connect the links electrically either to the signal receiver or to the test signal generator. The controller is configured to test one of the ground conductors and the corresponding link by instructing the switch to connect the corresponding link to the test signal generator and instructing the test signal generator to generate an electrical test signal. The electrical test signal is then supplied to the corresponding ground conductor by way of the link. The system also comprises a meter configured to measure a current flowing through the corresponding link.

In some embodiments, each link comprises a co-axial cable and connections for coupling the co-axial cable to the ground conductors at one end and the signal receiver at the other end. In other embodiments, the electrical test signal is at a frequency distinct from that of the uplink EM telemetry signal. In some embodiments the electrical test signal has a voltage less than 50 volts. For example, test signals may have voltages in the range of about 100 µV to about 50V. In yet other embodiments, the signal receiver comprises analog-to-digital converters, amplifiers, and/or preamplifiers. In yet further embodiments, the test signal generator comprises a mobile device interface through which the electrical test signal is generated upon interaction with a mobile device. The system may also have a display for showing results of the testing of the ground conductors and the corresponding links.

Another aspect provides a signal receiver comprising an input terminal for connection to a ground conductor, a test signal generator, an EM telemetry signal receiving circuit, a switch operable to selectively couple either an output of the test signal generator or an input for the EM telemetry signal receiving circuit to the input terminal, and a current monitor arranged to measure an electrical current delivered by the test signal generator to the input terminal. In some embodiments, there are a plurality of input terminals, switches, and ground conductors. In other embodiments, the switches are electronically controlled switches and the signal receiver comprises a controller configured to connect one of the switches to the test signal generator and to measure the electrical current when the test signal generator is active.

One aspect provides methods for testing connectivity in an EM telemetry system for transmission of a ground originating uplink EM telemetry signal. Some such methods include: instructing a switch to disconnect from a signal receiver, a link electrically connected between the signal receiver and a ground conductor and to connect the link electrically to a test signal generator, operating the test signal generator to generate an electrical test signal, and measuring a current flowing through the link.

In some embodiments, the method comprises the step of inspecting the integrity of the links. In further embodiments, the method comprises the step of replacing damaged or non-operating links. In other embodiments, the method comprises the step of reviewing the location of the ground conductor. In yet other embodiments, the method comprises the step of moving the ground conductor to another location. In yet further embodiments, the methods comprise repeating the testing of the ground conductor and connected link after the link and/or the ground conductor have been replaced or fixed. In some embodiments, the electrical test signal is at a frequency distinct from that of the uplink EM telemetry signal and the electrical test signal has a voltage between 100 µV and 50V. In other embodiments, the electrical test signal is generated by a mobile device interfacing with the test signal generator. In yet other embodiments, the EM telemetry system comprises a plurality of ground conductors and links and the steps are repeated for each of the ground conductors and the links.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

FIGS. 5A to 5D are front views of user interfaces that may be used in a system for testing connectivity in an EM telemetry system according to an embodiment of the present invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
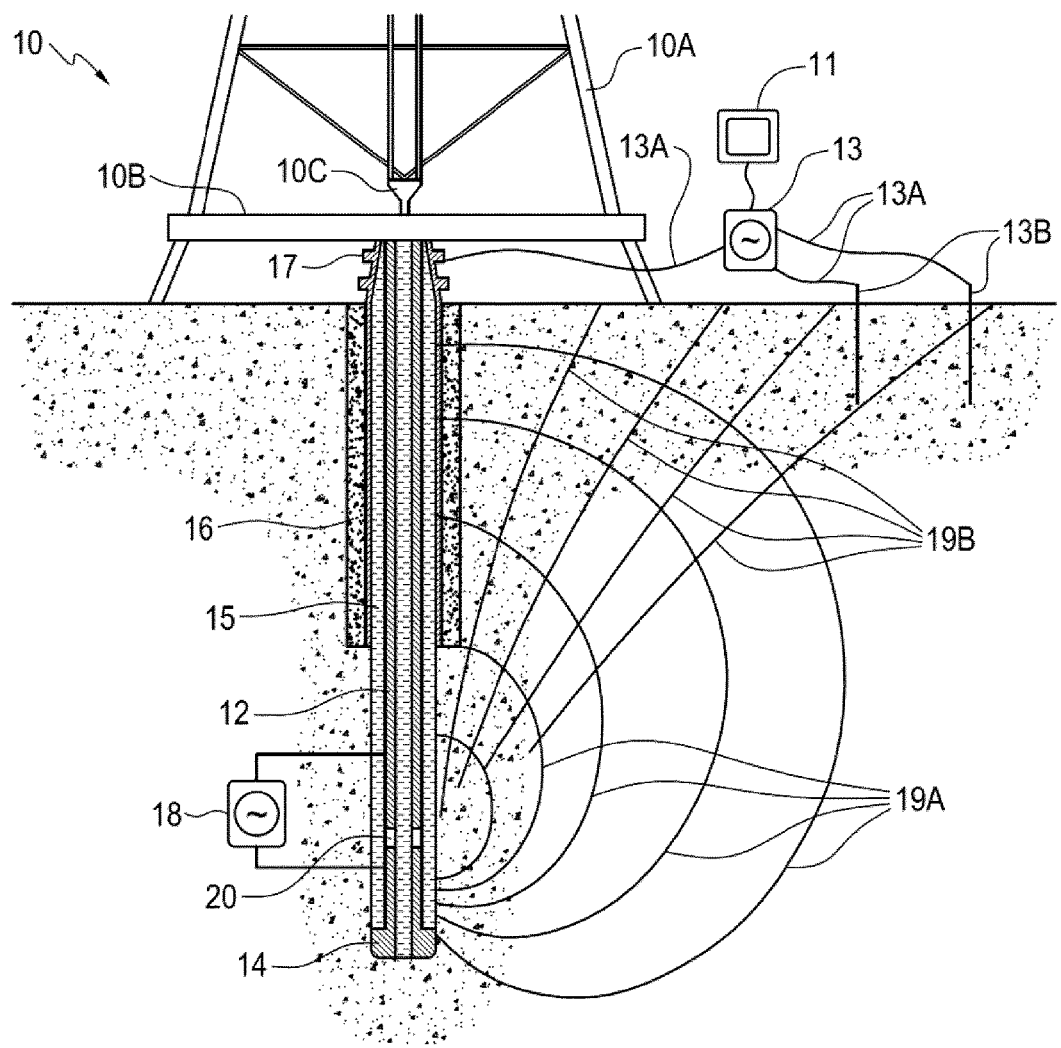
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blowout preventer 17 is supported at a top end of the casing. The drill rig illustrated in FIG. 1 is an example only. The methods and apparatus described herein are not specific to any particular type of drill rig.

A gap sub 20 may be positioned, for example, at the top of the BHA. Gap sub 20 divides the drill string into two electrically-conductive parts that are electrically insulated from one another. The two parts form a dipole antenna structure. For example, one part of the dipole may be made of the BHA up to the electrically insulating gap and the other part of the dipole may be made up of the part of the drill string extending from the gap to the surface.

A very low frequency alternating current (AC) electrical signal 19A is generated by an EM telemetry signal generator 18 and applied across gap sub 20. The low frequency AC signal energizes the earth and creates an electrical field 19A which results in a measurable voltage differential between the top of drill string 12 and one or more grounded electrodes (such as ground rods or ground plates). Electrical signal 19A is varied in a way which encodes information for transmission by telemetry.

At the surface the EM telemetry signal 19A is detected. Links 13A connect one or more ground conductors 13B located about the drill site and the top of the drill string to a signal receiver 13. Signal receiver 13 can then detect EM telemetry signals 19A by measuring potential differences between the top of the drill string and ground conductors 13B. Ground conductors 13B may be at any suitable locations. In one embodiment, ground conductors 13B comprise grounded electrodes. In yet other embodiments, ground conductors 13B comprise grounded metal rods. In still other embodiments, ground conductors 13B comprise electrodes of the same or different conductive materials. Signal receiver 13 decodes the transmitted information. A display 11 displays some or all of the received information. For example, display 11 may show received measurement while drilling ("MWD") information to the rig operator.

It is not uncommon for EM telemetry signals to be on edge of receivability. During operation, EM telemetry signals can be lost. It is sometimes unclear as to whether the loss of signal is due to failure of equipment or poor conditions for signal transmission. Breaks in and/or poor connections in links connecting an EM telemetry signal receiver to ground conductors is one mode of equipment failure that can cause problems in EM signal receipt. Such breaks can be caused by animals, people, equipment or the like. Poor connections may result from improper installations, corrosion, or the like.

Another factor affecting the success of EM telemetry transmissions is the loss or decrease in signal strength due to links that cannot properly carry EM telemetry signals from the ground conductors to the signal receiver. In some cases, the problems with the links are faulty cables. Such faults might not be identified before installation. Problems with the links may also be due to environmental conditions (such as snow/mud burying the cable from visible sight), damage from vehicular traffic on the surface of the formation, or loose connection between the links and ground conductors and/or between the links and the signal receiver.

Therefore, when EM telemetry signal is lost or at a low level, it is difficult to determine if the problem is due to: (a) failure of downhole equipment such as the BHA; (b) EM telemetry signal is below limits and sensitivity of the signal receiver; (c) links forming bad connections to the signal receivers from the ground conductors; (d) failure of the signal receiver; or (e) a combination of two or more of these causes.

Manual checking ground conductors and their links to a signal receiver is time consuming and cumbersome and involves considerable manpower. Also, problems with the links and the connections between the links and the ground conductors and/or the signal receiver may not be readily detectable by visual inspection because the problems could arise from non-visible defects. Checking ground conductors and the links between them and the signal receiver may get in the way of the various tasks related to assembling, operating, and disassembling drill rigs. Field personnel have to physically inspect each of the links to determine if the link is carrying EM telemetry signals from the ground conductors to the signal receiver at sufficient strength. Personnel may be placed at risk, such as risks of electric shocks or the like, in certain areas on the surface of the formation in which drilling is taking place.

Whether or not EM telemetry transmissions from a downhole source can be reliably detected at the surface can depend on many factors. Some of these factors have to do with the characteristics of the underground formations through which the well bore from which the electromagnetic telemetry is being performed passes. The electrical conductivity of the underground environment can play a major role in the effectiveness of electromagnetic telemetry (higher electrical conductivity, especially in the vicinity of gap sub 20 tends to attenuate EM telemetry signals). Both the average electrical conductivity of the underground environment as well as the way in which the electrical conductivity may vary from place to place can play significant roles.

Another factor that can affect electromagnetic telemetry is the depth from which electromagnetic telemetry is being performed. In general, electromagnetic telemetry signals become more highly attenuated as the depth from which the electromagnetic telemetry signals are being transmitted increases.

Another factor that may affect the success in receiving EM telemetry transmissions at the surface is the particular arrangement of ground conductors provided at the surface (e.g. the particular arrangement of grounding rods and other apparatus used at the surface as well as the sensitivity of the circuitry used to detect EM telemetry signals).

In general, lower-frequency-EM telemetry signals can be successfully transmitted from deeper locations than higher-frequency-EM telemetry signals. For this reason, EM telemetry signals typically have very low frequencies. For example, EM telemetry signals generally have frequencies in the band below 24 Hertz. For example, EM telemetry signals according to some embodiments of the invention have frequencies in the range of about 1/10 Hertz to about 20 Hertz. The exact endpoints of these ranges are not critically important.

One advantage of the use of higher frequencies for EM telemetry is that the rate at which data can be encoded in higher-frequency-EM telemetry signals is greater than the rate at which the data can be encoded in lower-frequency-EM telemetry signals. Consequently, there is a trade-off between increasing the likelihood that EM signals can be successfully transmitted from a given depth by using very low frequencies and achieving an increased data rate by using higher frequencies. Furthermore, if the frequency is too high then the EM signals will be so strongly attenuated that no practical detector could pick them up at the surface.

Selection of carrier frequency for EM telemetry signals can have consequences beyond the amount of time required to transmit a certain amount of data to the surface. For example, transmitting at higher frequencies may significantly affect the amount of electrical power required to transmit a certain amount of data. One reason for this is that if data can be transmitted quickly then, after the data has been transmitted (or in other periods during which it is not necessary to be transmitting data), certain circuits may be shut down to conserve electrical power. In addition, since the electrical impedance seen by an EM telemetry transmitter is somewhat frequency dependent, the amount of electrical power required to sustain an EM telemetry signal is also frequency dependent to some degree. On the other hand, higher frequencies are attenuated more strongly than lower frequencies and so higher frequency signals may need to be transmitted at higher amplitudes (thereby requiring more electrical power).

Another factor that influences the success of EM telemetry transmissions is the amplitude of the EM telemetry signals. Increased amplitude signals are easier to detect at the surface. However, the amplitude of EM telemetry signals may be limited by the capabilities of the downhole EM telemetry transmitter. For example, if the EM telemetry transmitting circuits can deliver only up to a maximum electrical current then the amplitude of the EM telemetry signal will also be limited.

Other limits are imposed by the maximum voltage that can be imposed by the EM telemetry transmitter on the downhole antenna elements. The voltage of an EM telemetry signal may be limited by the nature of the EM telemetry signal generator as well as its power source. In some cases the voltage may be limited by design to being below a threshold voltage for safety reasons. For example, in some embodiments, the voltage may be limited to a voltage of 50 volts or less in order to reduce the likelihood that personnel who are handling the EM telemetry signal generator at the surface could be exposed to electrical shocks and/or to reduce the likelihood that the EM signal generator could serve as an ignition source.

The voltage that may be applied across the EM telemetry antenna elements may also depend on the characteristics of the gap. Typically, for a longer gap, a larger voltage may be applied without exceeding the electrical current capabilities of the EM telemetry signal generator. In addition to the above, increasing the amplitude of EM telemetry signals generally results in increased electrical power consumption. It is therefore desirable not to transmit EM telemetry signals that have amplitudes much greater than necessary.

Figure 2:
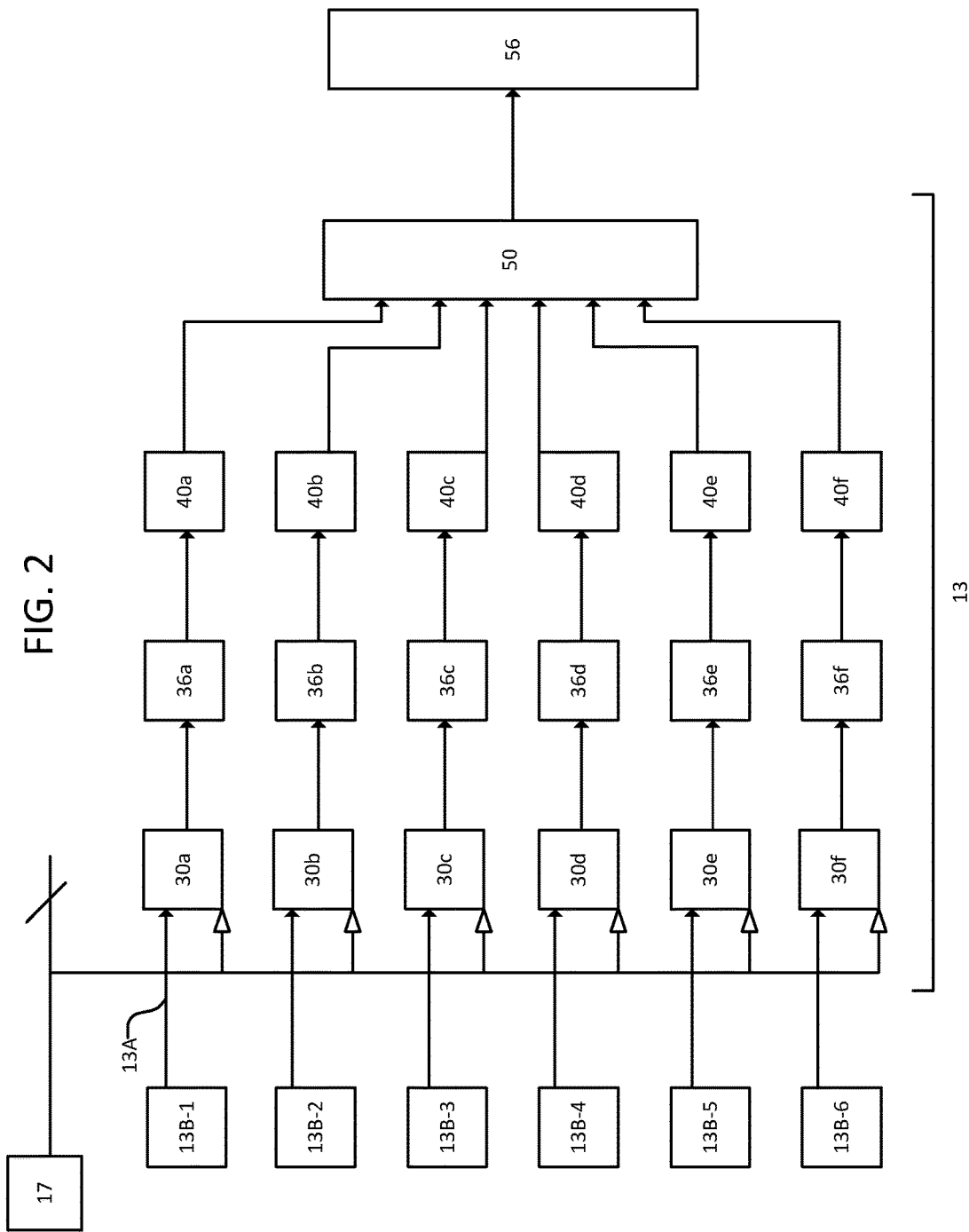
FIG. 2 is a schematic view of an example prior art telemetry system that includes a signal receiver and ground conductors.

FIG. 2 is a schematic view of a prior art telemetry system that includes a signal receiver 13. This prior art signal receiver 13 comprises circuits for detecting EM telemetry. In the illustrated embodiment these circuits include preamplifiers 30, amplifiers 36, analog-to-digital converters 40, a signal receiver controller 50, and an interface 56.

In the signal receiver 13 illustrated in FIG. 2, six ground conductors (13B-1, 13B-2, 13B-3, 13B-4, 13B-5, and 13B-6) are connected to the signal receiver 13 by six corresponding links 13A. Ground conductors 13B are connected to their respective preamplifiers 30a, 30b, 30c, 30d, 30e, and 30f. Preamplifiers 30 are differential amplifiers that have two inputs, one input being the electric potential picked up by the ground conductors 13B and the other input being the electric potential from the blowout preventer 17. Blowout preventer 17 is connected to each of preamplifiers 30a, 30b, 30c, 30d, 30e, and 30f, and it acts as a ground reference. Signal receiver 13 determines the potential difference between blowout preventer 13 and ground conductors 13B. Preamplifiers 30 yield outputs based on the potential differences between the EM signals received from ground conductors 13B and blowout preventer 17. Electric potentials sensed at blowout preventer 17 and ground conductors 13B-1, 13B-2, 13B-3, 13B-4, 13B-5, and 13B-6 manifest themselves as small electrical currents in links 13A. If links 13A are broken or have high electrical impedance, then the EM signals will not be received well or at all.

Outputs of preamplifiers 30a, 30b, 30c, 30d, 30e, and 30f are in turn connected to their respective amplifiers 36a, 36b, 36c, 36d, 36e, and 36f. Amplifiers 36a, 36b, 36c, 36d, 36e, and 36f are connected to their respective analog-to-digital converters 40a, 40b, 40c, 40d, 40e, and 40f. Therefore, electric potentials picked up by ground conductors 13B-1, 13B-2, 13B-3, 13B-4, 13B-5, and 13B-6 are amplified by preamplifiers 30a, 30b, 30c, 30d, 30e, and 30f, and further amplified by amplifiers 36a, 36b, 36c, 36d, 36e, and 36f.

Analog signals that are converted into digital information by analog-to-digital converters 40*a*, 40*b*, 40*c*, 40*d*, 40*e*, and 40*f*. The digital information is then transmitted to signal receiver controller 50 for analysis (e.g. extraction of telemetry data from the EM signals) and then for display on display 11 through interface 56.

In the prior art system, if uplink EM telemetry signals are not being clearly received, it is difficult to determine why this might be the case. A user cannot readily tell whether any of the links 13A is faulty and not properly carrying EM telemetry signals 19A from ground conductors 13B to signal receiver 13. If an EM signal 19A is not being properly received by the signal receiver 13 and links 13A could possibly be the problem, then each link 13A between a ground conductor 13B and the signal receiver 13 has to be manually checked to determine whether a specific link is faulty. As discussed earlier, manual checking of ground conductors 13B and their respective links 13A is time consuming and cumbersome and involves considerable manpower.

One aspect of the present invention provides methods and systems for testing connectivity in an EM telemetry system for receiving a ground originating uplink EM telemetry signal at surface equipment. Some embodiments achieve such testing by applying test signals to the links at the signal receiver. If a link being tested has good connectivity, then the test signals can flow to ground through the link being tested, resulting in a detectable current. If the link is broken or provides a poor connection to ground, then the current flow resulting from application of the test signal to the link will be reduced or essentially no current will flow. In some embodiments, the current resulting from application of the test signal is measured and processed to yield an indication of the connective quality of the link. This indication may be displayed to an operator. Testing systems according to some embodiments include controllers configured to automatically test one or more links.

Apparatus and methods according to some example embodiments of this invention are configured to perform and/or, when in use, are operated to perform one or more of the following (in any combination):

- a switch is actuated to disconnect a link electrically connecting the signal receiver to a ground conductor from a signal receiver;
- the link is electrically connected to a test signal generator, the test signal generator generates a test signal and the test signal is applied to the link at the signal receiver; and
- current flowing through the link is measured while the test signal is being supplied to determine whether the ground conductor and corresponding link are operating properly.

Figure 3A:
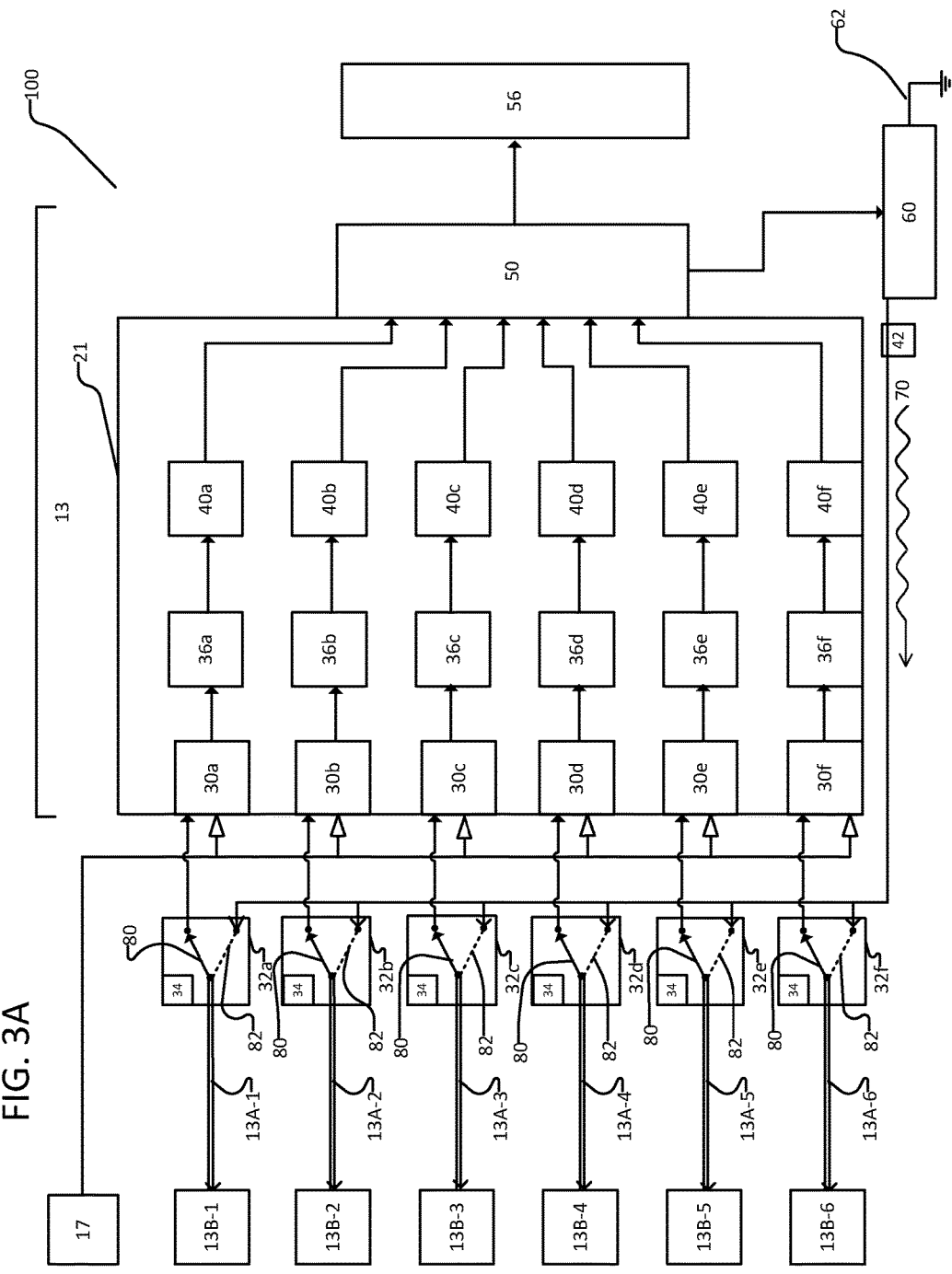
FIG. 3A is a schematic view of a system for testing connectivity in an EM telemetry system for transmission of a ground originating uplink EM telemetry signal according to an embodiment of the present invention.

FIG. 3A illustrates an example system 100 for testing connectivity in an EM telemetry system for transmission of a ground originating uplink EM telemetry signal. System 100 comprises a test signal generator 60 and switches 32. Switches 32 are coupled to links 13A. System 100 includes EM signal detection circuit 21 for receiving and processing uplink and EM telemetry signals, signal receiver controller 50, and interface 56. EM signal detection circuit 21 may be any circuit suitable for receiving telemetry signals. For example, circuit 21 may optionally comprise preamplifier 30, amplifier 36, and/or analog-to-digital converter 40. In this embodiment, each link 13A comprises a cable, a connection at one end of the cable to couple the cable to ground conductor 13B and another connection at the other end of the cable to couple the cable to an input of system 100 which connects to one of preamplifiers 30.

In the illustrated embodiment, there are six ground conductors 13B (13B-1, 13B-2, 13B-3, 13B-4, 13B-5, and 13B-6). Preamplifiers 30, amplifiers 36, and analog-to-digital converters 40 have similar functions as in the signal receiver shown in FIG. 2.

In one embodiment, the cables in link 13A are co-axial cables. Preferably, the cables are low-noise cables. The shielding conductors of the co-axial cables may be connected to a system ground (e.g. a potential of a power-line ground conductor). In other embodiments, other types of cables capable of transmitting information in an EM telemetry system as known by a person skilled in the art in light of the present disclosure may be used. In one embodiment, the same type of cables is used for all connections between components of system 100. In other embodiments, different types of cables are used for different connections.

The various components of signal receiver 13 may be within the same housing. In other embodiments, some of the components of signal receiver 13 may be in the same housing and other components may be separately located. There is no limitation on how the components of signal receiver 13 have to be located as long as they are connected to allow for transmission of the EM telemetry signals 19A received from ground conductors 13B to signal receiver 13.

Switches 32 are coupled to links 13A between ground conductors 13B and preamplifiers 30. In this embodiment, one switch 32 is coupled to each link 13A between each of the ground conductors 13B and the corresponding preamplifiers 30. Switches 32 may be within a signal receiver unit having connectors for links 13A.

Accordingly, switch 32*a* is coupled to link 13A-1 between ground conductor 13B-1 and preamplifier 30*a*; switch 32*b* is coupled to link 13A-2 between ground conductor 13B-2 and preamplifier 30*b*; switch 32*c* is coupled to link 13A-3 between ground conductor 13B-3 and preamplifier 30*c*; switch 32*d* is coupled to link 13A-4 between ground conductor 13B-4 and preamplifier 30*d*; switch 32*e* is coupled to link 13A-5 between ground conductor 13B-5 and preamplifier 30*e*; and switch 32*f* is coupled to link 13A-6 between ground conductor 13B-6 and preamplifier 30*f*.

In this embodiment, switches 32 are single pole double throw (SPDT) switches to allow a corresponding link to be connected either to an input of signal receiver circuit 21 or to test signal generator 60. Switch controllers 34 are configured to control switches 32 to selectively connect any one of links 13A electrically either to signal receiver 13 or to test signal generator 60. In this embodiment, switch 32 electrically connects link 13A to signal receiver 13 when it is in an operational configuration 80 and electrically connects link 13A to test signal generator 60 when it is in a diagnostic configuration 82. Switch controller 34 mediates the change of switch 32 between operational configuration 80 and diagnostic configuration 82. Switch controllers 34 may be stand-alone controllers, collectively provided by one or more controllers or integrated with a controller that provides other functions such as, for example, controller 50. In further embodiments, one switch controller 34 may control multiple switches 32. In some embodiments one or more switches 32 are manually-operable.

Those skilled in the art will understand that other arrangements of switches may be provided to permit a link 13A to be selectively connected either to signal receiving circuit 21 or test signal generator 60. As a non-limiting example of an alternative switch arrangement, two separately-controllable switches may be provided, one switch to connect or disconnect the link from signal receiving circuit 21 and another switch to connect or disconnect the link from test signal generator 60.

In one embodiment, switches 32 comprise relays. In other embodiments, switches 32 comprise electronic switches. In other embodiments switches 32 are manually operated. In some embodiments, switches 32 comprise double pole, double throw switches.

System 100 also comprises a meter 42 for measuring the current within link 13A while test signal 70 is being supplied to ground conductor 13B through links 13A. In some embodiments, more than one meter 42 is provided for measuring currents on different links 13A.

Figure 3C:
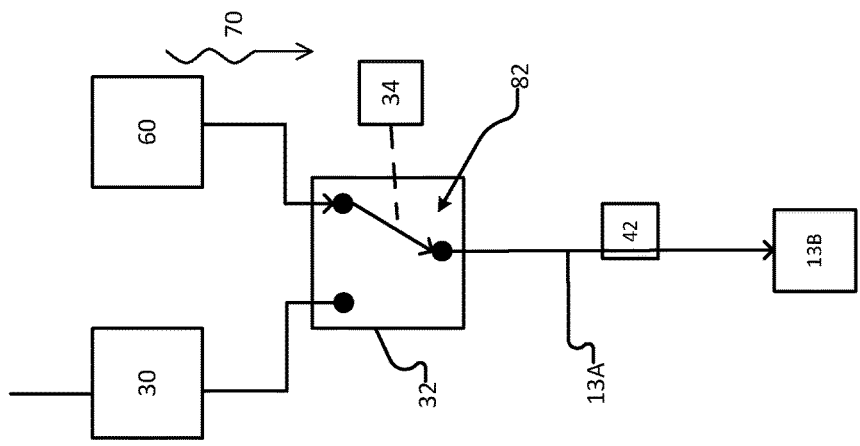
FIG. 3C is a schematic view of a switch in a diagnostic configuration in a system for testing connectivity in an EM telemetry system according to an embodiment of the present invention.
Figure 3B:
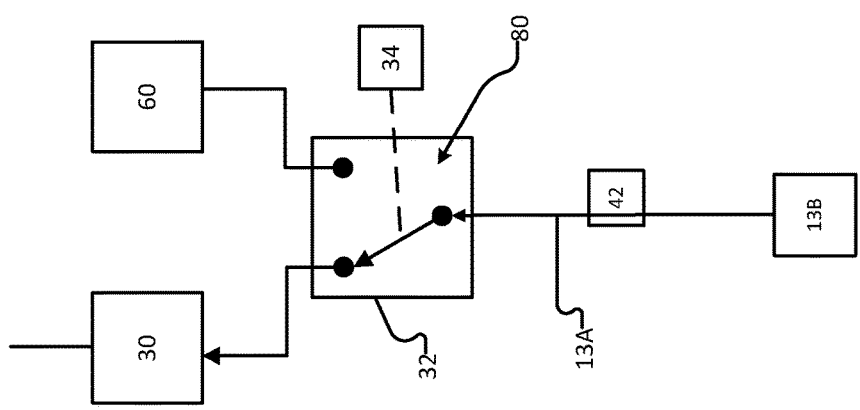
FIG. 3B is a schematic view of a switch in an operational configuration in a system for testing connectivity in an EM telemetry system according to an embodiment of the present invention.

FIGS. 3B and 3C are schematic views illustrating a switch 32 in operational configuration 80 and in diagnostic configuration 82 according to an example embodiment. In FIG. 3B, in operational configuration 80, switch 32 connects link 13A to preamplifier 30 in signal detection circuit 21, and uplink EM telemetry signal 19A can be transmitted from ground conductor 13B to preamplifier 30 in signal receiver 13. When it is desired to test the link 13A, test signal generator 60 is operated to generate test signal 70 and switch controller 34 causes switch 32 to switch to the diagnostic configuration 82, as shown in FIG. 3C, where link 13A is disconnected from preamplifier 30 and then connected to test signal generator 60. Test signal 70 can then be supplied to ground conductor 13B through link 13A, and meter 42 can measure the current, if any, flowing through link 13A while test signal 70 is being supplied.

In FIG. 3A, operational configuration 80 of switch 32 is shown by a solid line within switch 32, and diagnostic configuration 82 of switch 32 is shown by a segmented line within switch 32.

Figures 3D, 3E:
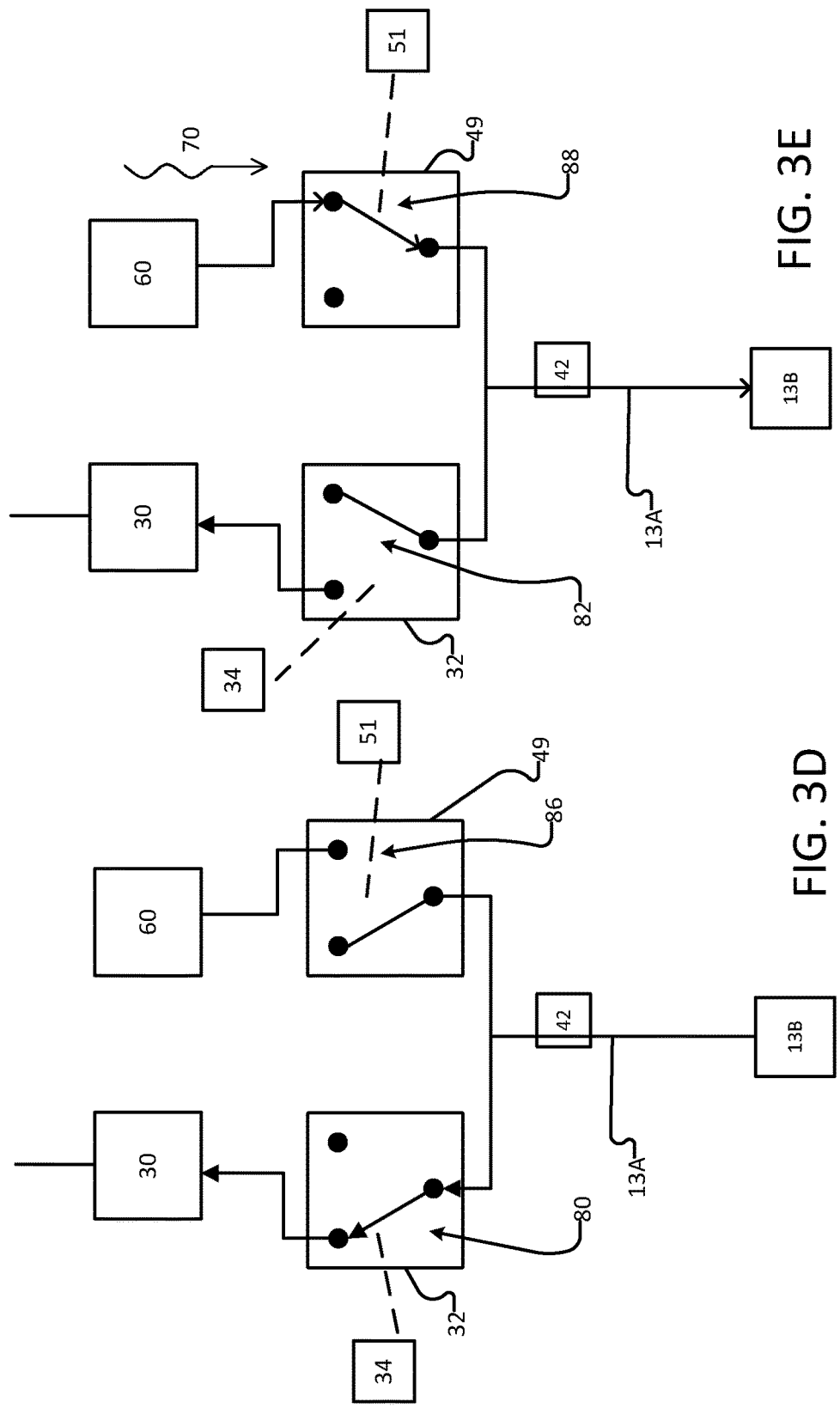
FIG. 3D is a schematic view of two switches in operational configurations in a system for testing connectivity in an EM telemetry system according to an embodiment of the present invention.
FIG. 3E is a schematic view of two switches in diagnostic configurations in a system for testing connectivity in an EM telemetry system according to an embodiment of the present invention.

FIGS. 3D and 3E are schematic views illustrating another embodiment. This embodiment is generally similar to the embodiment shown in FIGS. 3B and 3C except that system 100 comprises a test signal generator switch 49 which is coupled to link 13A. Test signal generator switch control input 51 controls the change of test signal generator switch 49 between an operational configuration 86 and a diagnostic configuration 88.

FIG. 3D illustrates switch 32 and test signal generator switch 49 in operational configurations 80 and 86, respectively. When switch 32 and test signal generator switch 49 are in these operational configurations, test signal generator 60 is disconnected from link 13A and preamplifier 30 is connected to link 13A. Uplink EM telemetry signals 19A picked up by ground conductor 13B can be transmitted to preamplifier 30 through link 13A.

FIG. 3E illustrates switch 32 and test signal generator switch 49 in diagnostic configurations 82 and 88, respectively. When switch 32 and test signal generator switch 49 are in these diagnostic configurations, preamplifier 30 is disconnected from link 13A and test signal generator 60 is connected to link 13A. Test signal 70 can then be supplied to ground conductor 13B through link 13A. Test signal generator switch controller 51 and switch controller 34 are in communication to coordinate the changes of switch 32 and test signal generator switch 49 between operational and diagnostic configurations depending on whether testing of ground conductors 13B and links 13A is taking place.

In one embodiment, test signals 70 generated by test signal generator 60 are electrical currents and meters 42 comprise ammeters for measuring the current flowing through link 13A while test signals 70 are being applied to links 13A to the ground conductor 13B. The impedance of a link 13A may be determined from the known voltage of test signal 70 and the measured current by Ohm's law. For example, where the voltage of test signal 70 is 12 volts and the current value in a link 13A as measured by meter 42 exceeds 120 mA, then the calculated resistance would be less than 100 ohms. Such impedance values would indicate the specific link 13A has proper connectivity for transmitting EM telemetry signals 19A received from the corresponding ground conductor 13B. Where the impedance is high, for example, over 1000 ohms as indicated by little to no current flowing through link 13A, as measured by meter 42, then there is high resistance and link 13A needs to be investigated to determine the cause of the problem in link 13A. For instance, the cable within link 13A might be broken, the cable may not be properly connected to signal receiver 13 or to ground conductor 13B, or ground conductor 13B may be poorly grounded. No current flowing in a link 13A indicates that link 13A is broken or disconnected.

In other embodiments, meter 42 measures other characteristics of the electric current within link 13A while test signal 70 is being supplied to ground conductor 13B through link 13A.

In one embodiment, test signal 70 is a low frequency noise current. In some embodiments, test signals 70 comprise pure tone signals. The frequency of test signal 70 is adjustable in some embodiments. Test signal 70 may have, for example, a frequency in the range of 1 Hz to 40 Hz. Preferably, test signal 70 is at a frequency distinct from the frequency of EM telemetry signals 19A received by ground conductors 13B and also at a frequency different from any electrical interference such as 60 Hz powerline noise and harmonics of such noise so that the test signals can be differentiated from noise and other signals. In one embodiment, EM telemetry signals 19A are at a frequency at or lower than 20 Hz and test signals 70 are at a frequency above 20 Hz. In some embodiments, the EM telemetry signals 19A are blocked by a filter during testing of the ground conductor 13B and link 13A by system 100.

Test signal 70 has a voltage sufficient to yield a current detectable by meter 42 when a link 13A and ground conductor 13B are in good condition. To avoid the need for special electrical safety precautions, test signals 70 are less than 50 volts in some embodiments. In one example embodiment, test signal 70 has a voltage set at 24V. In another embodiment, test signal 70 may be at a voltage between 5V and 50V. Test signal 70 may be at a voltage that is greater than 5V. Test signal 70 may be applied between a power line ground 62 of signal generator 60 and a link 13A being tested.

Links 13A may, for example, be considered to have proper connectivity for transmitting EM telemetry signals 19A if the calculated resistance is less than 2000 ohms, and preferably, less than 200 ohms. In one embodiment, where test signal 70 has a voltage set at 24V, these thresholds correspond approximately to the measured current flowing through link 13A being at least 10 mA and preferably at least 100 mA. In this embodiment, low resistance means that test signal 70 is properly transmitted through an individual link 13A to the corresponding ground conductor 13B and link 13A has proper connectivity for transmitting EM telemetry signals 19A from the tested ground conductor 13B to signal receiver 13. For this example embodiment where the test signal is set at 24V, link 13A may not be able to carry EM telemetry signals 19A properly if the calculated resistance is greater than 4000 ohms (as calculated based on the measured current flowing through link 13A being below 5 mA). Therefore, further investigations of the ground conductor 13B and link 13A may be deemed necessary if the current falls below a corresponding threshold. The current ranges set forth in this paragraph are dependent on the voltage of test signal 70, which can be arbitrarily selected.

Test signal generator 60 may comprise an oscillator or other signal generator. In some embodiments test signal 70 is a pure tone. In other embodiments, test signal 70 comprises a range of frequencies. Test signal 70 may be fixed in waveform and/or amplitude. In other embodiments test signal 70 is variable in waveform and/or amplitude. Any suitable interface may be provided to permit control of waveform and/or amplitude.

In some embodiments, test signal generator 60 interfaces with an application on a mobile device whereby the mobile device can configure the type of test signal 70 to be generated by test signal generator 60. In further embodiments, a mobile device interfaces with test signal generator 60 through an audio output of the mobile device (e.g. a headphone jack). In other embodiments, test signal generator 60 has an interface to allow an audio file on the mobile device to be played and generated as test signal 70. In further embodiments, test signal generator 60 has interfaces for specific frequencies, such as, for example, 10 Hz and the like. In yet further embodiments, such interfaces comprise radio buttons. A frequency may be selected for test signal 70 that is distinct from frequencies of electrical noise and other electrical signals present at the drilling site.

In FIGS. 3A to 3E, EM telemetry signals 19A received by ground conductors 13B and then transmitted to receiver 13 are indicated by arrows having filled triangular ends. Test signals 70 are indicated by arrows having V-shaped ends and signals from blowout preventer 17 are indicated by arrows having unfilled triangular ends.

In the embodiment illustrated in FIG. 3A, system 100 is used to test the impedance of links used to receive an uplink EM telemetry signal in an EM telemetry system. Test signal generator 60 is operated to generate a test signal 70. Depending on which ground conductor 13B is to be tested, switch 32 for the ground conductor 13B to be tested disconnects the corresponding link 13A from being electrically connected to signal receiver 13, and connects such link 13A to test signal generator 60. For instance, if ground conductor 13B-1 is to be tested, then switch 32a would disconnect link 13A-1 from being electrically connected to preamplifier 30a and then electrically connect link 13A-1 to test signal generator 60. Test signal 70 is then generated by test signal generator 60 and supplied to the applicable ground conductor 13B through the corresponding link 13A. For instance, where ground conductor 13B-1 is being tested, test signal 70 is supplied through link 13A-1. Meter 42 then measures the current flowing through link 13A-1 while test signal 70 is being supplied. Where ground conductor 13B-2 is being tested, meter 42 would measure the current flowing through link 13A-2 and so on.

Figure 3F:
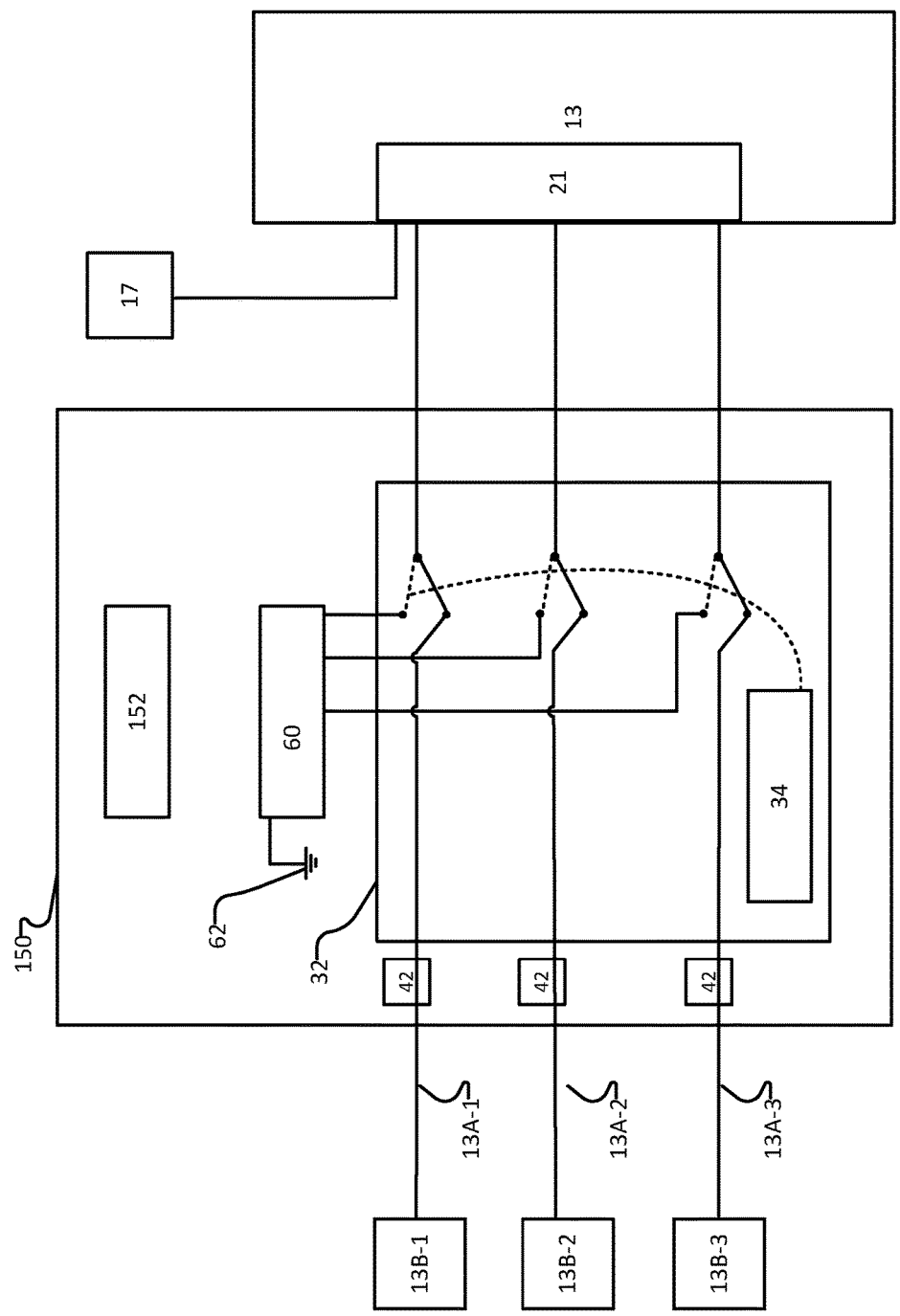
FIG. 3F is a schematic view of a tester for use in retrofitting to existing EM telemetry system according to an embodiment of the present invention.

FIG. 3F is a schematic view of a tester 150 for use in retrofitting an existing EM telemetry system. Tester 150 comprises test signal generator 60, switch controller 34, switch 32, and meters 42. Tester 150 can be used with existing EM telemetry systems, such as the signal receiver 13 shown in FIG. 2, by connecting links 13A to switch 32 and also connecting switch 32 to EM signal detection circuit 21 in signal receiver 13. Tester 150 may also comprise tester display 152 for displaying the results of the connectivity tests performed for each ground conductor 13B and link 13A.

In some embodiments, test signal generator 60 comprises a selection interface that allows users to select which ground conductor 13B is to be tested. In other embodiments, test signal generator 60 interfaces with a selector that can be used to select which ground conductor 13B is to be tested. In yet other embodiments, test signal generator 60 may automatically test each of the ground conductors 13B and corresponding links 13A in a sequence and provide a report of the connectivity status of ground conductors 13B and links 13A.

In one embodiment, test signal generator 60 is configured to test each individual ground conductor 13B. Test signal generator 60 supplies test signals 70 to each of the individual ground conductors 13B consecutively and generates and displays a report on a display to indicate whether any of the ground conductors 13B and corresponding links 13A have connectivity problems that prevent uplink EM telemetry signals 19A from being transmitted to signal receiver 13 with sufficient strength. The testing may be initiated by a user, initiated automatically on a periodic basis by signal generator 60 itself, and/or initiated remotely through the use of software and computing devices.

In some embodiments, a user operates a control (e.g. by pressing a button) to test a particular link 13A. Operating the control may cause a test signal 70 from test signal generator 60 to be supplied to the ground conductor 13B to be tested through link 13A. The user then reviews the current measured within link 13A while test signal 70 is being supplied to determine if link 13A is carrying test signal 70 to ground conductor 13B. This process may be repeated for each of the ground conductors 13B and link 13A. In yet other embodiments, user manually changes signal generator switch 53 and/or test signal generator switch 49 for the applicable link 13A to diagnostic configuration 92 as well.

In some embodiments, a user operates a control to initiate the testing of one ground conductor 13B and link 13A. In other embodiments, operating a control initiates the testing sequence of all of the ground conductors 13B and link 13A. In yet other embodiments, a user interacts with a graphical user interface on a display to initiate testing of the ground conductors 13B and links 13A. In further embodiments, signal generator 60 communicates with a portable device that allows the user to use the portable device to initiate the testing of the ground conductors 13B and links 13A without manual changes of switches 32, test signal generator switch 49, and/or signal generator switch 53 (if applicable).

In some embodiments, testing of ground conductors 13B and links 13A may be automatically performed by system 100 at periodic intervals. System 100 is configured to initiate the testing of a first ground conductor 13B. Once the testing of the first ground conductor 13B is complete, system 100 will test each of the other ground conductors 13B in a sequence. The testing may also be done during periods of inactivity of the BHA and/or when telemetry is idle. In yet other embodiments, the timing of the testing of ground conductors 13B and links 13A is scheduled by the users.

In one embodiment, during testing of the ground conductors 13B and links 13A by system 100, the EM telemetry system is turned off, and no EM telemetry signals 19A are being sent from the BHA. In other embodiments, during testing of the ground conductors 13B and links 13A, EM telemetry signals 19A are not received by signal receiver 13 from the ground conductor 13B and link 13A being tested, but EM telemetry signals 19A are still being received by signal receiver 13 from other ground conductors that are not currently being tested. In one embodiment, as each ground conductor 13B and link 13A is disconnected from signal receiver 13 and tested by system 100, the previously tested ground conductor 13B is reconnected to signal receiver 13 for transmission of EM telemetry signals 19A to signal receiver 13. In other embodiments, reconnection of tested links 13A to signal receiver 13 does not take place until all of the ground conductors 13B have been tested. In yet other embodiments, reconnection of tested links 13A takes place at the operator's discretion.

In one embodiment, preamplifiers 30, amplifiers 36, and analog-to-digital converters 40 of EM signal detection circuit 21 are arranged in the manner illustrated in FIG. 3A. In other embodiments, EM signal detection circuit 21 comprises preamplifiers 30, amplifiers 36, analog-to-digital converters 40, or a combination of some or all of them. In yet other embodiments, EM signal detection circuit 21 detects and receives EM telemetry signal 19A without the use of preamplifiers 30, amplifiers 36, and/or analog-to-digital converters 40. FIG. 3F illustrates signal receiver 13 comprising an EM signal detection circuit 21.

Switch controller 34, signal receiver controller 50, and test signal generator switch controller 51 may comprise a processor, a computer, a field programmable gate array (FPGA), or any other computing device capable of measuring, analyzing, interpreting and/or computing data and/or software instructions.

Resistance, as calculated from current flowing through link 13A after test signal 70 is supplied, outside certain threshold levels would indicate problems with the connectivity of link 13A and/or ground conductor 13B being tested. Repairs or replacement of the applicable link 13A or replacement/relocation of the applicable ground conductor 13B may be undertaken. In one embodiment, the threshold levels are calculated based in part on the characteristics of the specific area in which system 10 has been deployed.

Figure 4:
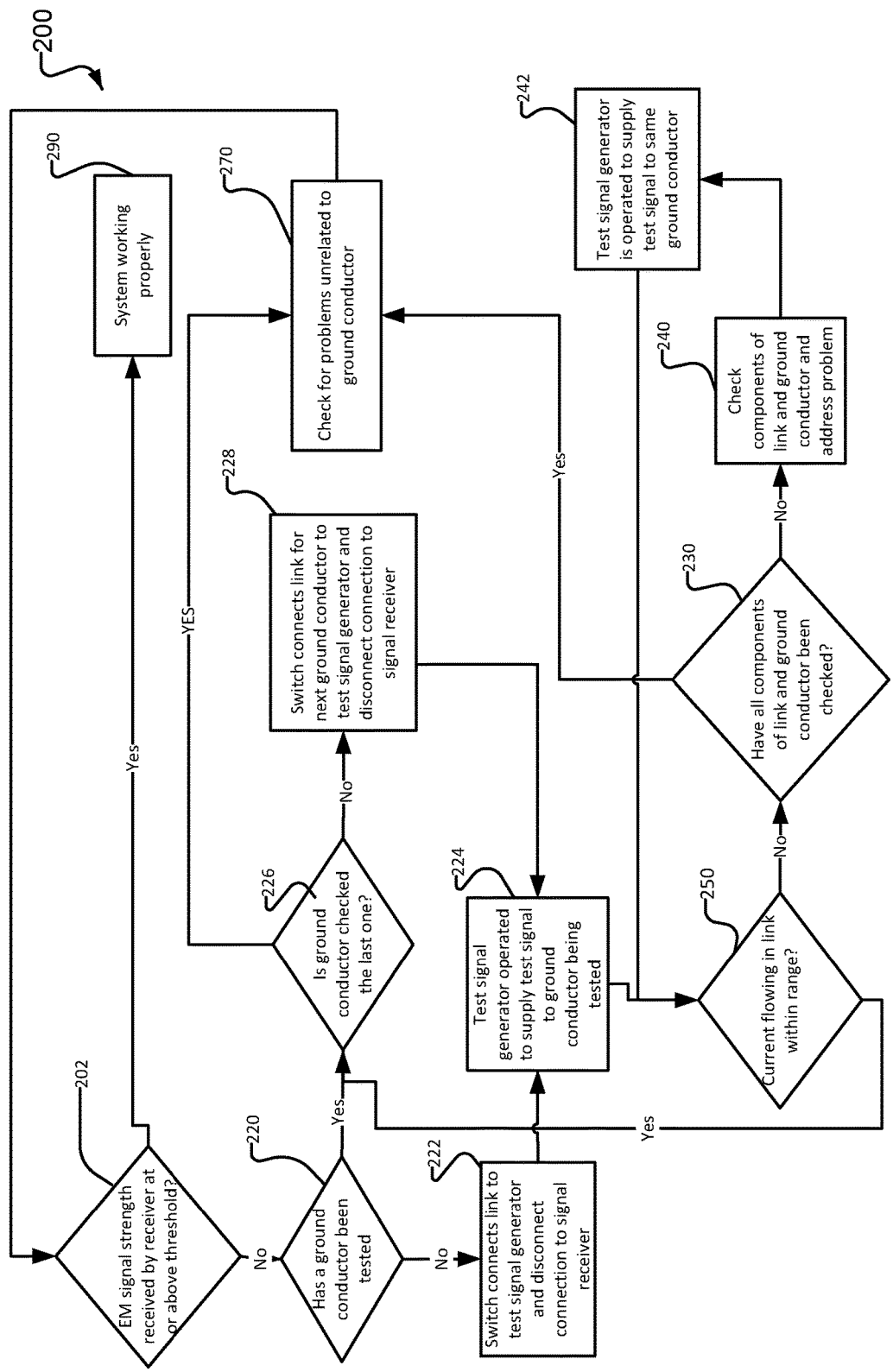
FIG. 4 is a flow chart illustrating an example method for testing connectivity in an EM telemetry system for transmission of a ground originating uplink EM telemetry signal according to another embodiment of the present invention.

FIG. 4 is a flow chart illustrating an example method 200 for testing connectivity in an EM telemetry system for receiving an uplink EM telemetry signal according to another embodiment of the present invention. In block 202, the strength of one or more EM telemetry signals 19A being received at signal receiver 13 is assessed to determine whether the signals are being received at or above threshold levels, such as a voltage of at least 0.1 mV and preferably at least 1.0 mV. If EM telemetry signals 19A are being received by signal receiver 13 at or above threshold levels, then method 200 proceeds to box 290 and stops, as EM telemetry signals 19A are being transmitted from ground conductor 13B to signal receiver 13 at sufficient strength to allow signal receiver 13 to extract the telemetry information within the received EM telemetry signals 19A. In other embodiments, method 200 further comprises the step of repeating block 202 and subsequent steps on a scheduled basis. In one embodiment, box 202 and subsequent steps are repeated on an hourly basis. In other embodiments, box 202 and subsequent steps are repeated at pre-determined times each day and/or as part of an initiation sequence of a signal receiver. Where the EM telemetry signals 19A are being received by signal receiver 13 below threshold levels, method 200 proceeds to block 220 to determine whether a ground conductor 13B has been tested. If no ground conductor 13B has been tested, then method 200 proceeds to box 222 where a test signal 70 is supplied to a first ground conductor 13B. If a ground conductor 13B has already been tested, then method 200 proceeds to box 226 and determines if the last ground conductor has been checked. Where all ground conductors 13B have been checked, then method 200 proceeds to 270 to check for problems unrelated to the ground conductors 13B in the EM telemetry system.

Where it is determined at box 220 that no ground conductor 13B has been tested, method 200 proceeds to box 222 where switch 32 coupled to the first ground conductor 13B disconnects it from signal receiver 13 and connects it to test signal generator 60. Method 200 then proceeds to box 224. In box 224, test signal generator 60 generates a test signal 70 and supplies it to ground conductor 13B being tested through the applicable link 13A. Meter 42 measures the current flowing through link 13A while test signal 70 is being supplied to determine whether the impedance of the links falls within pre-determined ranges, such as the impedance being between 50 and 2000 ohms where test signal 70 has a voltage of 24V. If the current within link 13A falls within the pre-determined ranges, then method 200 proceeds to box 226 again to determine if the last ground conductor 13B has been checked. If not, then method 200 proceeds to box 228 where switch 32 coupled to the next ground conductor 13B disconnects it from signal receiver 13 and connects it to test signal generator 60. Method 200, optionally, comprises the step of reconnecting the tested link 13A for the applicable ground conductor 13B to signal receiver 13 after the current within link 13A has been measured and determined to be within predetermined ranges in box 250.

If the current flowing through link 13A at the first ground conductor 13B is outside the pre-determined range, then method 200 proceeds to box 230 to determine if all of the components of the tested link 13A, including the cable and the connection, and ground conductor 13B have been checked. If not, then method 200 proceeds to box 240 to check the components of link 13A and ground conductor 13B to determine the cause of the low current measurement. For instance, the connection of link 13A between ground conductor 13B and the cable of link 13A or the connection of link 13A between signal receiver 13 and the cable of link 13A may be loose or the cable in link 13A may be faulty or damaged such that it cannot properly carry EM telemetry signals 19A. Accordingly, the connection or the cable of link 13A may be fixed or replaced at block 240. Ground conductor 13B may also be located in a position where it is not receiving any EM telemetry signals 19A from the BHA and ground conductor 13B may need to be relocated.

Once the problems with tested link 13A and/or ground conductor 13B have been identified and addressed at box 240, then method 200 proceeds to box 242 where signal generator 60 generates another test signal 70 and supplies it to the same ground conductor 13B. The current within link 13A is again tested at box 250 and, if current is still outside of the pre-determined range, the steps outlined in boxes 230, 240, and 242 repeats until all of the components of link 13A and ground conductor 13B have been checked. At this stage, method 200 then proceeds to box 270 to check for problems unrelated to the ground conductors 13B. The problems unrelated to the ground conductors 13B, such as problems with downhole signal transmission frequency, mud type, well depth, formation, and casing, are addressed in box 270, and method 200 then proceeds back to box 202 to check the strength of EM signal 19A being received by signal receiver 13.

Where fixes to the components of link 13A and/or ground conductor 13B are applied in box 240 and the subsequent test signal supplied in box 242 is within the pre-determined range, method 200 then proceeds to box 226 to determine if the tested ground conductor is the last one. If not, then method 200 proceeds to box 228 where switch connects the link for the ground conductor 13B to be tested to test signal generator 60, and it is disconnected from signal receiver 13. The steps in method 200 are repeated for each of the ground conductors 13. In one embodiment, the steps in method 200 are repeated until the strength of EM signal 19A received by signal receiver 13 is at or above threshold levels.

Method 200 may be modified to remove the problem investigation steps in box 230, 240, 242, and 270. In this modified method, ground conductors 13B and links 13A are tested consecutively and then the results for each tested ground conductor 13B and link 13A are displayed. An operator can then decide which ground conductor 13B and link 13A should be checked and investigated.

Methods and systems according to different example embodiments may be used at different times. System 100 and/or method 200 may be used to test transmission of uplink EM telemetry signals 19A in a EM telemetry system after the system has been set up at the formation to ensure that links 13A are operating properly prior to drilling. System 100 and/or method 200 may also be used when EM signal 19A is not being received by one or more of the ground conductors 13B. In other embodiments, system 100 and/or method 200 may be used to determine why EM signal levels are dropping (including when EM signal is lost) while drilling is taking place within the formation.

FIGS. 5A to 5D illustrate example user interfaces that may be used with system 100. The interfaces shown in FIGS. 5A to 5D show connectivity information for individual ground conductors 13B and link 13A and the numerical resistance values as calculated from the measured current flowing through link 13A and the voltage of test signal 70. The numerical resistance values do not have to be shown on the display as part of the user interface. In these embodiments, connectivity information is determined based on the calculated resistance and whether the calculated resistance falls within pre-determined ranges. In FIG. 5A to 5D, the connectivity for each ground conductor 13B is categorized into three categories: "GOOD", "FAIR", and "POOR". The interfaces shown in FIGS. 5A to 5D differ in how the connectivity information is displayed. The category of connectivity is shown using words in the FIG. 5A interface and indicator lights in the FIG. 5B interface. In FIG. 5C, the connectivity information is shown using different shaped lights, with circle meaning "GOOD", square meaning "FAIR", and cross meaning "POOR". In FIG. 5D, the connectivity information is shown using different intensity of indicator lights, with full intensity meaning "GOOD", half intensity meaning "FAIR", and light intensity meaning "POOR". In other embodiments, resistance information is shown through a moving needle on a dial. In yet further embodiment, connectivity of ground conductors 13B and links 13A are categorized using different colours. In yet other embodiments, additional categories may be used for assessing connectivity of a ground conductor 13B and link 13A. In further embodiments, the pre-determined resistance ranges for the connectivity categories may be changed by the user. In yet other embodiments, the current figures used for calculating the resistance values for the connectivity categories are automatically updated based on the voltage of the test signal 70 used for the tests.

In one embodiment, user interfaces shown in FIGS. 5A to 5D are shown on a display connected to system 100. In other embodiments, these user interfaces are shown on a portable device wirelessly communicating with system 100. In yet other embodiments, additional information for each ground conductor 13B and link 13A may be shown, such as the geographical location of the ground conductor 13B. In yet further embodiments, the connectivity information for each ground conductor 13B and link 13A may be shown on a map of the formation along with location information of the drill string, BHA, and ground conductors 13B.

Efficiencies in MWD EM telemetry can be affected by many factors, including the ability of ground conductors to create the differences in electric potential and the signal strength (which may be related to attenuation of the telemetry signal through the material in the formation). To maximize effective electrical potential with the ground conductors, it is common practice to add water or saline solution around the ground conductors to reduce contact resistance between the ground conductors and the earth resistance immediately surrounding the ground conductors. Addition of water may be critical in very dry ground conditions as the movement and transfer of ions to and from the grounding rods may require moisture.

Therefore, system 100 and method 200 may be used to assist in the configuration of ground conductors around the formation and to determine whether additional actions, such as the addition of water or saline solution around ground conductors 13B or repositioning of ground conductors 13B, need to be taken in order to maximize the effective electrical potential in the ground conductors.

Certain embodiments described herein may provide the advantage of the ability of evaluating connectivity of some or all of the ground conductors without having to physically check the cables individually one by one. Other embodiments may also allow the checking of whether each ground conductor is at an appropriate location on the formation to act as a detector. Accordingly, even if links between the ground conductors and the signal receiver are working properly, the embodiments allow the determination of an optimal configuration of the ground conductors on the formation to ensure sufficient EM signals from the BHA are being received and transmitted to the signal receiver.

As will be apparent to those skilled in the art in the light of the foregoing disclosure, many alterations and modifications are possible in the practice of this invention without departing from the spirit or scope thereof.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

INTERPRETATION OF TERMS

Unless the context clearly requires otherwise, throughout the description and the claims:
   "comprise", "comprising", and the like are to be construed in an inclusive sense, as opposed to an exclusive or exhaustive sense; that is to say, in the sense of "including, but not limited to".
   "connected", "coupled", or any variant thereof, means any connection or coupling, either direct or indirect, between two or more elements; the coupling or connection between the elements can be physical, logical, or a combination thereof.
   "herein", "above", "below", and words of similar import, when used to describe this specification shall refer to this specification as a whole and not to any particular portions of this specification.
   "or", in reference to a list of two or more items, covers all of the following interpretations of the word: any of the items in the list, all of the items in the list, and any combination of the items in the list.
   the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A system for testing connectivity of an EM telemetry receiver to one or more ground conductors, the system comprising:
    a ground conductor in electrical contact with the ground;
    a signal receiver electrically connected to the ground conductor by a link;
    a test signal generator configured to generate an electrical test signal and to supply it to the ground conductor by way of the link;
    a switch operable to selectively couple the link to the test signal generator or to the signal receiver; and
    a meter configured to measure a current flowing from the test signal generator to the link
wherein the electrical test signal comprises a pure tone and the pure tone has a frequency of above 20 Hz.

2. A system according to claim 1 wherein the link is one of a plurality of links to a corresponding plurality of ground conductors.

3. A system according to claim 2 comprising a controller connected to automatically test the plurality of links one at a time.

4. A system according to claim 3 wherein each one of the links is selectively connectible to either an input of the signal receiver and the test signal generator by operating a corresponding electrically controlled switch and each of the electrically controlled switches is connected to be operated by the controller.

5. A system according to claim 1 wherein the electrical test signal is at a frequency distinct from that of an uplink EM telemetry signal being received at the signal receiver.

6. A system according to claim 1 wherein the electrical test signal has a voltage less than 50V.

7. A system according to claim 1 wherein the signal receiver comprises at least one amplifier configured to amplify the received EM telemetry signal.

8. A system for testing connectivity of an EM telemetry receiver to one or more ground conductors, the system comprising:
    a ground conductor in electrical contact with the ground;
    a signal receiver electrically connected to the ground conductor by a link;
    a test signal generator configured to generate an electrical test signal and to supply it to the ground conductor by way of the link;
    a switch operable to selectively couple the link to the test signal generator or to the signal receiver; and
    a meter configured to measure a current flowing from the test signal generator to the link
wherein the electrical test signal comprises a pure tone and the system comprises a controller configured to compute an electrical resistance of the link.

9. A system according to claim 8 comprising an interface configured to display an indication of a condition of the link based on the resistance.

10. A system according to for testing connectivity of an EM telemetry receiver to one or more ground conductors, the system comprising:
    a ground conductor in electrical contact with the ground;
    a signal receiver electrically connected to the ground conductor by a link;
    a test signal generator configured to generate an electrical test signal and to supply it to the ground conductor by way of the link wherein the electrical test signal comprises a pure tone;
    a switch operable to selectively couple the link to the test signal generator or to the signal receiver;
    a meter configured to measure a current flowing from the test signal generator to the link; and
    a filter operative to block uplink EM telemetry signals when the link is coupled to the test signal generator.

11. A system according to claim 10 wherein each link comprises a cable and connections to couple the cable to the ground conductor at one end and to the signal receiver at the other end.

12. A system according to claim 11 wherein the cable comprises a co-axial cable.

13. A system according to claim 10 wherein the signal receiver comprises an analog-to-digital converter for converting the received EM telemetry signals into digital information.

14. A system according to claim 10 wherein one of the switches is coupled to at least two links and the switch comprises a test signal director.

15. A system according to claim 10 comprising a display configured to show results of the testing of the one or more ground conductors and the corresponding links.

16. A system according to claim 10 wherein the test signal generator comprises a mobile device interface and the electrical test signal is generated by a mobile device interacting with the test signal generator through the mobile device interface.

17. A receiver for electromagnetic telemetry signals, the receiver comprising:
- a plurality of inputs, the plurality of inputs comprising at least one reference input and a plurality of ground inputs;
- a plurality of amplification circuits each of the amplification circuits connected to amplify potential differences between a corresponding one of the ground inputs and one of the at least one reference inputs;
- a test signal generator having an output;
- a switching matrix between the plurality of inputs and the plurality of amplification circuits, the switching matrix configurable to disconnect any selected one of the inputs from the corresponding one of the amplification circuits and to connect the selected one of the inputs to an output of the test signal generator;
- a current monitor operative to monitor an electrical current supplied to the selected one of the inputs by the test signal generator;
- a controller connected to receive an output of the current monitor and to determine a quality of a ground connection to the selected one of the inputs based at least in part on the electrical current supplied to the selected one of the inputs by the test signal generator; and
- a display connected to the controller to display an indication of the quality of the ground connection to the selected one of the inputs.

18. A receiver according to claim 17 wherein the test signal generator is configured to output a direct current test signal.

19. A receiver according to claim 17 wherein the test signal generator is configured to output an alternating current test signal.

20. A receiver according to claim 19 wherein the alternating current test signal has a frequency in excess of 20 Hz.

21. A receiver according to claim 17 wherein the controller is configured to determine an electrical resistance of the ground connection to the selected one of the inputs.

22. A receiver according to claim 21 wherein the controller is configured to cause the display to display the electrical resistance of the ground connection to the selected one of the inputs.

23. A receiver according to claim 21 wherein the controller is configured to display on the display the indication of the quality for each one of the inputs.

24. A receiver according to claim 17 wherein the controller is configured to sequentially set different ones of the inputs to be the selected one of the inputs.

25. A receiver according to claim 17 wherein the test signal generator is configured to provide only output voltages of less than 50 volts.

26. A receiver according claim 17 wherein the controller is configured to periodically select a different one of the inputs to be the selected one of the inputs.

* * * * *